United States Patent [19]

Tinet et al.

[11] 4,334,007
[45] Jun. 8, 1982

[54] PROCESS OF MAKING AN OPTICALLY RECORDABLE AND READABLE INFORMATION CARRIER AND THE CARRIER OBTAINED BY THIS PROCESS

[75] Inventors: Claude Tinet; Claire Lemonon, both of Paris, France

[73] Assignee: Thomson-Brandt, Paris, France

[21] Appl. No.: 253,273

[22] Filed: Apr. 13, 1981

Related U.S. Application Data

[60] Division of Ser. No. 189,222, Sep. 22, 1980, Pat. No. 4,288,510, which is a division of Ser. No. 42,450, May 25, 1979, Pat. No. 4,252,889, which is a continuation of Ser. No. 835,282, Sep. 20, 1977, abandoned.

[30] Foreign Application Priority Data

Sep. 24, 1976 [FR] France .............................. 76 28771

[51] Int. Cl.³ .............................................. G03C 1/76
[52] U.S. Cl. .................................... 430/270; 430/275; 430/496
[58] Field of Search .................. 430/270, 275, 11, 14, 430/16, 17, 290, 321, 327, 344, 395, 496, 524, 952, 964; 346/107 R, 135.1–137; 358/128–132

[56] References Cited

U.S. PATENT DOCUMENTS

| | | | |
|---|---|---|---|
| 3,661,580 | 5/1972 | Mayand | 430/25 |
| 3,687,664 | 8/1972 | Broadbent | 430/314 |
| 3,689,264 | 9/1972 | Chandross et al. | 430/1 |
| 3,730,720 | 5/1973 | Cuthbert et al. | 430/321 |
| 3,894,179 | 7/1975 | Jacobs | 178/6.6 R |
| 3,956,582 | 5/1976 | Bouwhuis | 358/130 |
| 3,982,943 | 9/1976 | Feng et al. | 430/312 |
| 4,109,045 | 8/1978 | Goshima et al. | 358/130 |

FOREIGN PATENT DOCUMENTS 1451799 10/1976 United Kingdom .
1503197  3/1978 United Kingdom .

Primary Examiner—Won H. Louie, Jr.
Attorney, Agent, or Firm—Cushman, Darby & Cushman

[57] ABSTRACT

This invention relates to the production of information carriers on which the information is recorded along a track; the process of making the information carrier comprises a first step of materializing the track itself before recording any information by forming a groove in an auxiliary layer, the track thus being capable of being optically detected, and a second step of recording the information in a photosensitive layer in contact with the auxiliary layer along the track previously formed.

3 Claims, 4 Drawing Figures

PROCESS OF MAKING AN OPTICALLY RECORDABLE AND READABLE INFORMATION CARRIER AND THE CARRIER OBTAINED BY THIS PROCESS

This is a division of application Ser. No. 189,222 filed Sept. 22, 1980, U.S. Pat. No. 4,288,510, which in turn is a division of Ser. No. 42,450, filed May 25, 1979, now U.S. Pat. No. 4,252,889, and which is a continuation of Ser. No. 835,282, filed Sept. 20, 1977, now abandoned.

This invention relates to data carriers of the type intended for the optical recording and reading of information.

Conventional carriers of this type, in disc or tape form, are such that a succession of elements resulting in local changes in a parameter of the recording layer (its depth, its refractive index, its coefficient of absorption, reflection or transmission) are capable of being optically detected and constitute the transcription of an angularly modulated information carrier wave. This succession of elements is situated on a track which, depending upon the nature of the carrier (tape or disc), is either linear or spiral or in the form of concentric rings. Although the invention is applicable to both types of carrier, the following description will relate more particularly to the disc which is the most interesting material embodiment in regard to the speed of access to any region of the carrier for the recording or reading of information.

Radial and vertical servocontrols are used for the reading head to ensure that the reading spot remains centered on the track in spite of the mechanical eccentricity of the moving carrier and faults in the flatness of the carrier.

During reading, the non-recorded zones of the track are indistinguishable from those zones of the carrier situated outside the track. Conventional systems use the succession of elements recorded along the track for forming the signal indicating an error in the radial position. To this end, therefore, the carrier must not contain an excessively long "blank" zone, i.e. a significant portion of track on which no information is recorded. The position error signal is generally worthless unless it can be detected within a period at least equal to 1 hundredth of the duration of rotation of the carrier (this value given by way of indication arises out of the characteristics generally shown by carriers of the type in question). Accordingly, the information must not be interrupted over a range of greater than about 1/100 of a revolution. This condition limits the dimensions of the non-recorded zones which could be reserved on the carrier for subsequent recordings, for example for completing a series of data previously recorded onto a predetermined fraction of the rings or spiral.

According to the invention, there is provided a process of making an optically recordable and readable information carrier comprising a step of covering a substrate with a photosensitive layer, a step of covering said photosensitive layer with an auxiliary layer, a step in which a smooth groove is formed in said auxiliary layer to make said photosensitive layer level along a continuous track, and a recording step in which information is recorded in said photosensitive layer along said track, said track and said information being distinctly detectable by optical reading means.

The invention also relates to the optically recordable and readable carrier, thus obtained, said carrier comprising a substrate, an auxiliary layer in which a smooth track is grooved and a photosensitive layer in which the information is recorded in the zones in contact with said smooth track, said track and said information being distinctly detectable by optical means.

The invention will be better understood and other features thereof will become apparent from the following description in conjunction with the accompanying drawings, wherein.

Figure 1:
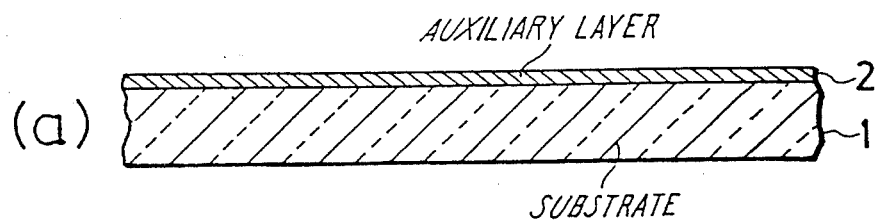
FIG. 1 is a section through the carrier in five steps of the production process according to the invention.
Figure 1:
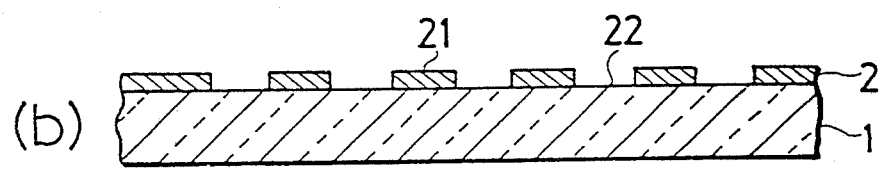
Figure 1:
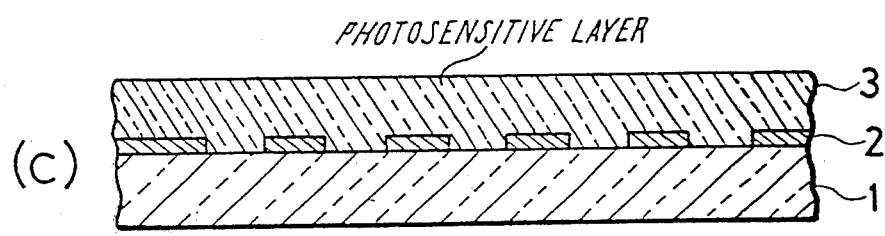
Figure 1:
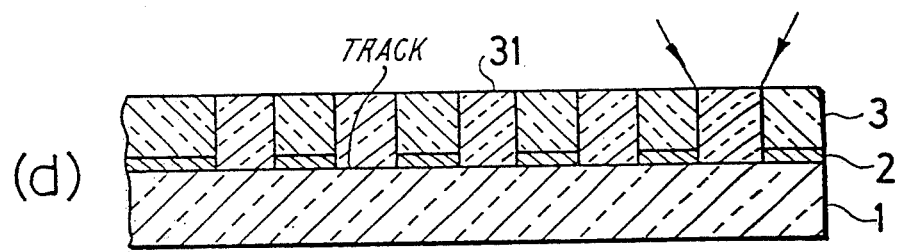
Figure 1:
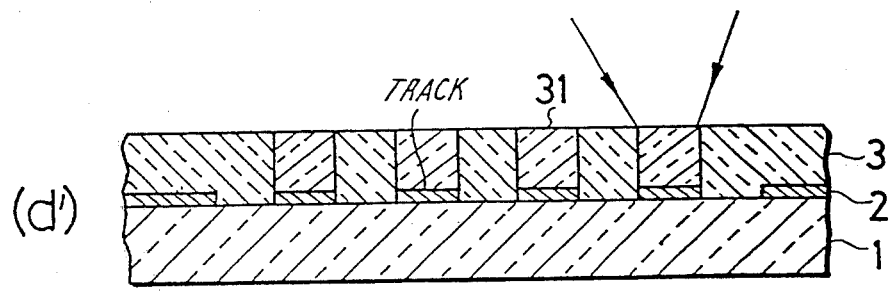

In FIG. 1, step (a) represents the carrier before treatment. The carrier is formed by a transparent substrate 1 with a low coefficient of reflection. This carrier may be flexible or rigid, depending upon the type of carrier required. Its thickness may amount to between one tenth of a millimeter, and a few millimeters. By way of example, the material used for forming this carrier may be glass or a transparent plastics material.

This substrate is covered by a thin auxiliary layer 2 having a thickness of 1 to 5 hundredths of a micrometer. This auxiliary layer is, for example, made of chromium or bismuth so that it has a high coefficient of reflection.

In a first production step, this auxiliary layer is locally removed by heat treatment to leave a groove in spiral form or in the form of concentric rings in the case of a disc (in the form of parallel bands in the case of a tape-form carrier). In this way, the substrate is left with a spiral or with rings (or bands) 21 in FIG. 1b), remaining from the layer 2, whilst the transparent substrate is level along a spiral or rings (or complementary bands) 22 in FIG. 1b). The substrate is then covered with a photosensitive layer 3 in FIG. 1c), for example a layer of thermosensitive suboxides which will be used for the recording of information. Recording is effected by radiant energy (of the order of a few tens of milliwatts) modulated by the information. This radiation is projected onto the track 31 formed either by the residue of the layer 2 (FIG. 1d') or by the groove formed by removal (FIG. 1d) and thus gives rise to the formation of oxides in the layer, these oxides having a refractive index different from that of the deposited sub-oxide.

Figure 2:
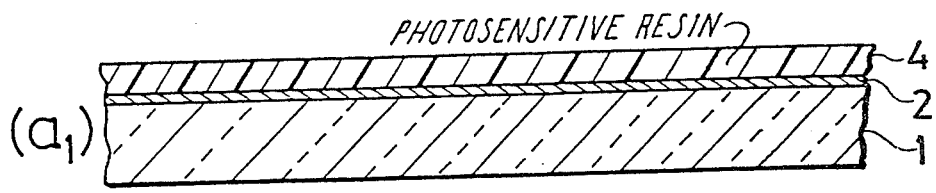
FIG. 2 is a section through the carrier in a succession of steps equivalent to the first step of the process described in reference to FIG. 1.
Figure 2:
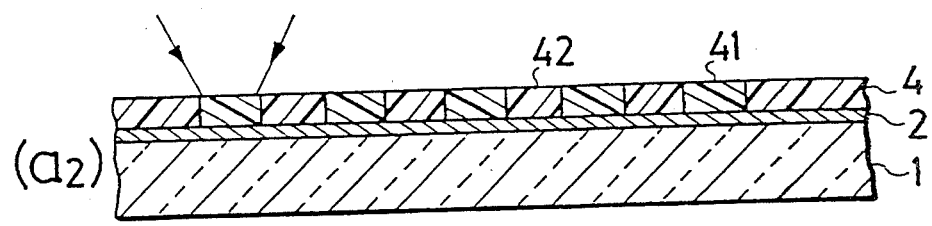
Figure 2:
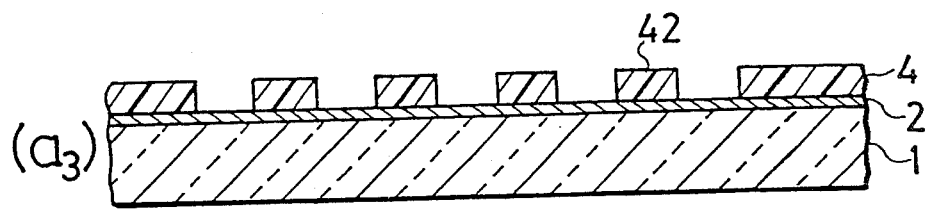
Figure 2:
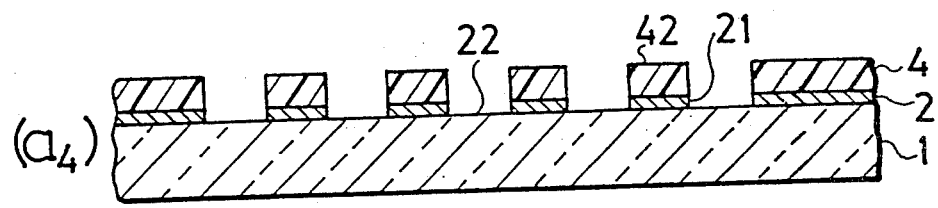
Figure 2:
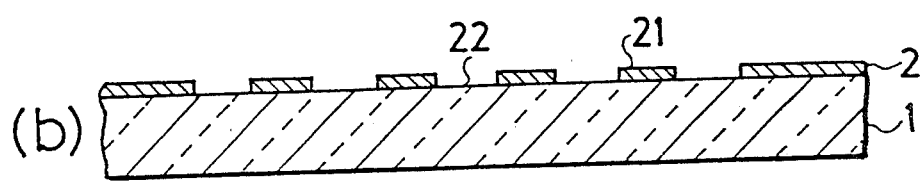

FIG. 2 illustrates the various steps of one variant of the production process illustrated in FIG. 1 relating to the local removal of the auxiliary layer, this removal being chemically effected. To this end, the carrier used comprises, in addition to the transparent substrate and the auxiliary layer 2, a photosensitive layer 4 (FIG. 2a₁) consisting of a positive or negative photosensitive resin. In the case of a positive resin, exposure is effected along the groove required in the auxiliary layer whilst, in the case of a negative resin, exposure is effected over those parts of the layer 2 which it is desired to retain. (FIG. 2a₂) shows a layer of positive photosensitive resin exposed along a groove 41, the unexposed parts being denoted by the reference 42.

The carrier thus exposed is then subjected to a chemical treatment (development), the exposed parts being dissolved and locally exposing the auxiliary layer. The auxiliary layer remains locally protected in the zones 42. The carrier is then chemically etched to dissolve the apparent zones of the layer 2, which makes the transparent substrate level along a groove 22 whilst the zones 21 of the layer 2 remain protected by the resin (FIG. 2a₄).

After residues of resin have been dissolved by a suitable solvent, the carrier appears (FIG. 2b) similar to the support of FIG. 1b). The process then comprises in the same way as before the steps of depositing a photo-sensitive layer and etching along a track superimposed upon the residue of the existing auxiliary layer or upon the groove materialised by removal of the auxiliary layer, as shown in FIG. 1, steps c and d (or d').

In these two variants of the production process, the sensitive layer which is used for recording is deposited after formation of the groove materialising the track on the carrier. However, it is also possible to deposit this sensitive layer before any recording on the disc, providing of course that the recording of the track in the auxiliary layer does not simultaneously leave an impression on the sensitive layer intended for the recording of information.

Figure 3:
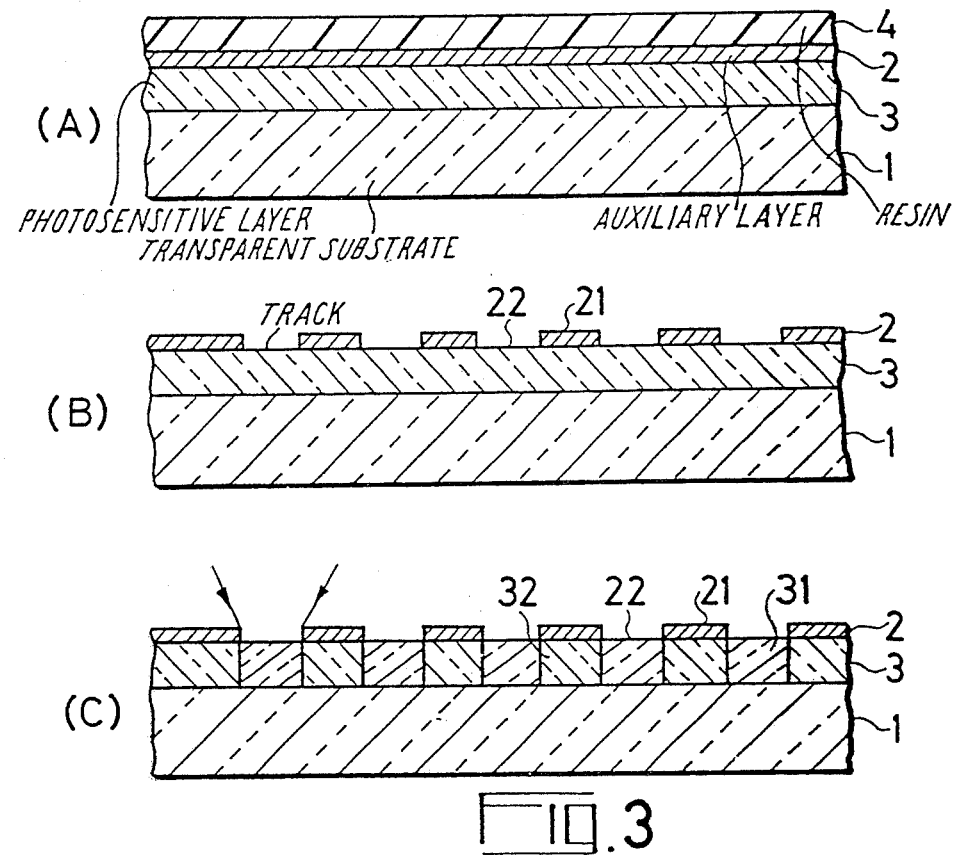
FIGS. 3 and 4 show the carrier in different steps of a variant of the production process described in reference to FIGS. 1 and 2.

To this end, as shown in FIG. 3A and in FIG. 4A, the starting carrier comprises a substrate 1 which is transparent in FIG. 3A and reflecting in FIG. 4A and onto which have been successively deposited a photo-sensitive layer 3 intended for the recording of information, a thin auxiliary layer 2 and a layer 4 of resin used, as shown in FIG. 2, for forming a mask (after exposure and development) protecting those zones of the layer 2 which are not to be etched during the chemical etching process intended for forming the groove in the auxiliary layer. After these various steps of the process and dissolution of the resin residues, the carrier is in the form shown in FIG. 3B. It is then possible to record information by modulated radiant energy concentrated onto the track formed by the zones 31 of the layer 3 following the level of the groove previously materialised in the auxiliary layer, the zones 32 remaining protected by the residue 21 of the auxiliary layer.

The carriers thus formed are readable by reflection or by transmission, depending upon whether the track on which the information is recorded rests on a reflecting or transparent surface. Thus, the carriers shown in FIGS. (1d') and (4C) are readable by reflection while the carriers shown in FIGS. (1d) and (3C) are readable by transmission.

The forms shown in (1d') and (4C) have the inherent advantages of reading by reflection (either by detecting variations in amplitude or by detecting variations in phase) over the corresponding carriers shown in FIGS. (1d) and (3C) which are readable by transmission.

Figure 4:
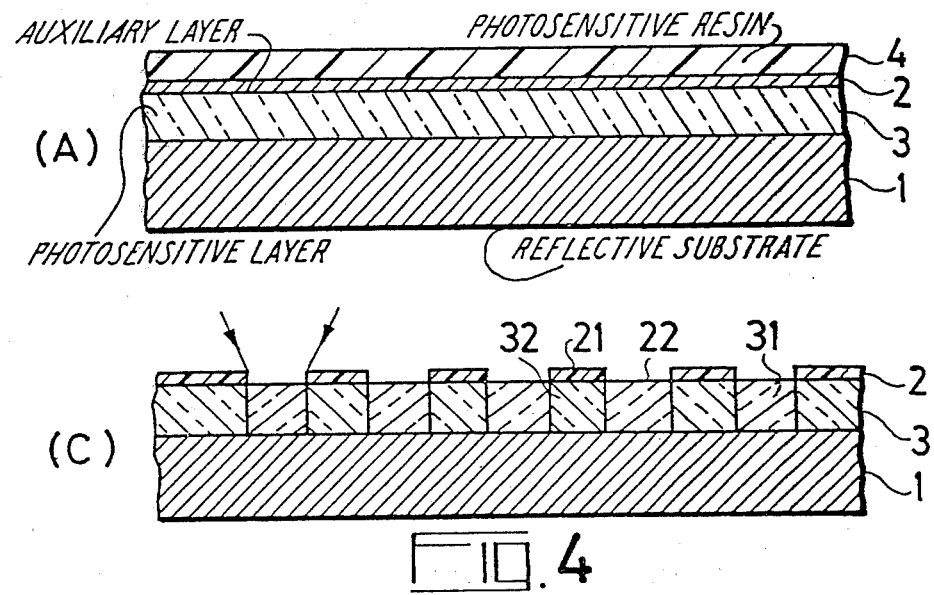

With regard to the radial servocontrol of the optical recording head or of the optical reading head, of which the object is to keep the focussing spot of the corresponding beam centered on the track, the various embodiments of a carrier having a materialized track lend themselves to servocontrol by the so-called wobbling technique described in French Pat. No. 2,260,163 and corresponding British Pat. No. 1,503,197. The carrier shown in FIG. 4 is such that the auxiliary layer residue and the reflecting substrate are separated by the recording layer, this layer having a considerable thickness in relation to half the length of a reading wave so that the difference in optical path between the rays impinging on the outside of the track (i.e. on the residue of the auxiliary layer) and the rays impinging on the reflecting substrate is considerable by comparison with the wavelength, but smaller than or equal to half the wavelength. Accordingly, a carrier such as this also lends itself to servo control by the direct detection of the radial error signal by means of transducers connected differentially as described in French Pat. No. 2,197,495 and corresponding British Pat. No. 1,451,799.

The invention is by no means limited to the production process and carrier described above.

In particular, the layer 4 on which information is recorded was stated in the description to be thermosensitive (which is particularly the case with the sub-oxide layers). The layer 4 may also be formed by a material having photochemical properties or by a material combining photothermal properties with photochemical properties. However, it is necessary during production to take these properties into account to ensure that the chemical etching process or the removal by heat treatment of the auxiliary layer does not transform the layer intended for recording (where it is subjacent as in FIGS. 3 and 4), or, on the other hand, to ensure that the recording in the sensitive layer deposited after formation of the groove (as in FIG. 1) does not attack what remains of the auxiliary layer after formation of the groove.

However, recording processes which do not require development of the sensitive layer are preferred because they provide for reading at the same time as recording, the information being readable immediately after it has been recorded.

In addition, the auxiliary layer was described as being reflecting and the bottom of the groove as being transparent or reflecting, depending upon the particular embodiments. In practice, it is sufficient for the auxiliary layer residue and the bottom of the groove formed in that layer to have a contrast which is capable of being optically detected and which is different from the contrast used for the recording and reading of information on the track.

Reading itself may be effected either from the phase profile (difference in path between the rays issuing from a recorded zone and a zone which has remained "blank") or from the amplitude profile by means of optical radiation having an electromagnetic wavelength of from 0.3 to 2 micrometers.

What we claim is:

1. An optically recordable and readable video disc or tape for use in an information storage system of the type comprising optical means for producing focussed reading and recording radiation beams to be projected onto said video disc or tape, and servocontrol means for maintaining said optical means and said video disc or tape in proper registry, said video disc or tape comprising:

a substrate;

a radiation sensitive layer covering said substrate; and an auxiliary layer covering said radiation sensitive layer and comprising a continuous recording track formed by a smooth groove being made in said auxiliary layer exposing a continuous track of said radiation sensitive layer following a predetermined configuration, said continuous track being optically trackable by said optical servocontrol means, and the track being recordable with elements of information by irradiating said radiation sensitive layer with said focussed recording radiation beam modulated by elements of information to be recorded to cause the formation of optically detectable structural changes in the structure of said radiation sensitive layer, said continuous track and said information being distinctly detectable by optical reading means sensitive to said optical-structural changes, and said track being detectable even in the absence of recorded information.

2. An optically recordable and readable video disc or tape for use in an information storage system of the type comprising optical means for producing focussed reading and recording beams to be projected onto said video disc or tape, and servocontrol means for maintaining said optical means and said video disc or tape in proper registry, said video disc or tape comprising:

a substrate;

an auxiliary layer covering said substrate, said auxiliary layer including a continuous track following a predetermined configuration, said continuous track being optically trackable by said servocontrol means; and a radiation sensitive layer covering said substrate contiguous to said auxiliary layer, said continuous track being recordable with elements of information by irradiating said radiation sensitive layer with said focussed recording radiation beam modulated by elements of information to be recorded to cause the formation of optically detectable structural changes in the structure of said radiation sensitive layer, said continuous track and said information being distinctly detectable by optical reading means sensitive to said optical-structural changes, and said track being detectable even in the absence of recorded information.

3. An optically recordable and readable video disc or tape for use in an information storage system of the type comprising optical means for producing focussed reading and recording radiation beams to be projected onto said video disc or tape, and servocontrol means for maintaining said optical means and said video disc or tape in proper registry, said video disc or tape comprising:

a substrate;

an auxiliary layer covering said substrate, and including a smooth groove and residual zones, the residual zones forming a continuous track on said substrate following a predetermined configuration, said track being optically trackable by said servocontrol means; and a radiation sensitive layer covering said substrate contiguous to said grooved auxiliary layer, said radiation sensitive layer being recordable with elements of information by irradiating said radiation sensitive layer adjacent to said continuous track with said focussed recording radiation beam modulated by information to be recorded to cause the formation of optically detectable structural changes in the structure of said radiation sensitive layer, said continuous track and said information being detectable by optical reading means sensitive to said optical-structural changes, and said track being detectable even in the absence of recorded information.

* * * * *